July 6, 1954  M. KERPCHAR  2,683,226

VOLTAGE LIMITING DEVICE

Filed Sept. 30, 1950

INVENTOR.
MICHAEL KERPCHAR
BY
ATTORNEY

Patented July 6, 1954

2,683,226

UNITED STATES PATENT OFFICE 2,683,226

VOLTAGE LIMITING DEVICE

Michael Kerpchar, Clifton, N. J., assignor to Bendix Aviation Corporation, Teterboro, N. J., a corporation of Delaware Application September 30, 1950, Serial No. 187,807

4 Claims. (Cl. 307—149)

1

The invention relates to voltage limiting devices, and more particularly to a voltage limiting device which produces a sinusoidal output voltage.

The main object of the present invention is to limit the amplitude of a sinusoidal voltage without distorting its wave form.

Another object is to provide a voltage limiting device which is simple in construction, requires relatively few parts, and is compact in design.

Another object is to provide a device of the kind described which can be used as a modulator.

The invention contemplates a device having an input for receiving a signal and an output for producing a voltage corresponding to the signal but of limited amplitude. An impedance is connected between the input and output, and means adapted to be energized by a pulsating current provides for current flow through the impedance when the signal amplitude exceeds the limiting amplitude so that a voltage drop occurs across the impedance to provide an output voltage corresponding to the signal but of limited amplitude.

The foregoing and other objects and advantages of the invention will appear more fully hereinafter from a consideration of the detailed description which follows, taken together with the accompanying drawing, wherein one embodiment of the invention is illustrated. It is to be expressly understood, however, that the drawing is for the purposes of illustration and description only, and is not to be construed as defining the limits of the invention.

Figure 1:
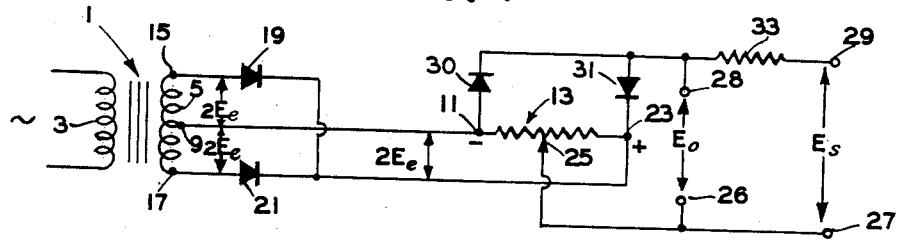
Figure 1 is a schematic wiring diagram showing a voltage limiter constructed according to the invention.

Referring now to the drawing for a more detailed description of the novel voltage limiter of the present invention, the voltage limiter is shown in Figure 1 as including a full wave rectifier with a transformer 1 having a primary winding 3 excited by an alternating voltage and a center-tapped secondary winding 5. The center-tap 9 of secondary winding 5 is connected to one side 11 of a potentiometer 13 and opposite ends 15, 17 of secondary winding 5 are connected through rectifiers 19, 21 of any suitable kind to the other side 23 of potentiometer 13.

2

Figure 2:
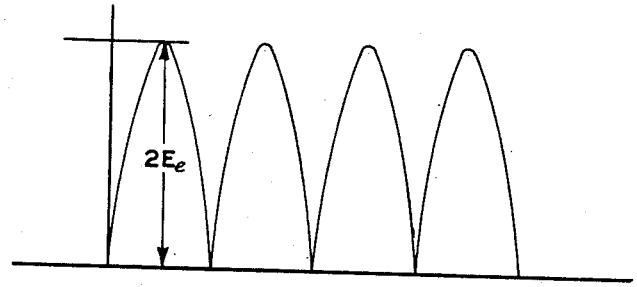
Figures 2 and 3 show voltage curves for exciting the voltage limiter shown in Figure 1.

When transformer 1 is excited, an alternating voltage $4E_e$ appears across secondary winding 5 and rectifier 19 passes current during the half cycle when end 15 of secondary winding 5 is positive relative to center-tap 9, and rectifier 21 passes current during the half cycle when end 17 of secondary winding 5 is positive relative to center-tap 9. A pulsating voltage $2E_e$, shown in Figure 2, appears across potentiometer 13 with side 23 positive relative to side 11.

Figure 3:
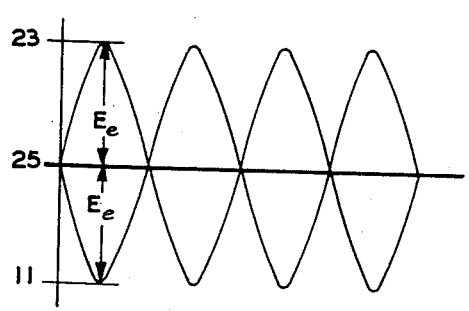

An adjustable tap 25 on potentiometer 13 is connected to one output terminal 26 and to one input terminal 27 of an alternating signal source, such as an amplifier (not shown). As shown in Figure 3, tap 25 of potentiometer 13 is positive relative to side 11 and negative relative to side 23 of potentiometer 13. Sides 11 and 23 are connected through oppositely disposed rectifiers 30, 31, respectively, to the other output terminal 28 and through a resistor 33 to the other input terminal 29 of the signal source. Resistor 33 may be of relatively high value, preferably about 220,000 ohms.

Figure 4:
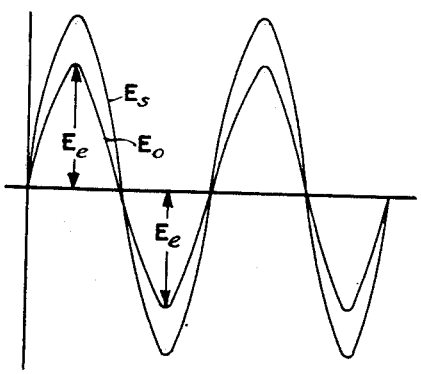
Figure 4 shows an input signal curve and corresponding output voltage curve of limited amplitude as determined by the exciting voltages of Figures 2 and 3.

When a sinusoidal signal $E_s$ is impressed on terminals 27, 29, rectifier 30 passes current when terminal 29 is instantaneously negative relative to side 11 of potentiometer 13 and rectifier 31 passes current when terminal 29 is instantaneously positive relative to side 23 of potentiometer 13. Such current flow occurs only when signal $E_s$ is instantaneously greater than voltage $E_e$. The voltage $E_e$ and the signal voltage $E_s$ must be in phase or 180 degrees out of phase with one another—that is, the nulls of the voltage $E_e$ and signal $E_s$ must occur simultaneously, otherwise the output voltage $E_o$ across terminals 26, 28 will be distorted. The amplitude of voltage $E_e$ determines the limit of the voltage $E_o$. When the amplitude of signal $E_s$ is below the limiting value, then no current flows in the circuit including terminal 29, resistor 33, rectifiers 30, 31, potentiometer 13 and terminal 27, and the output voltage $E_o$ is identical to the signal and appears across output terminals 26, 28. When the amplitude of the signal exceeds the limiting value, as determined by voltage $E_e$, then current flows through the above circuit including rectifier 30 or rectifier 31 as determined by the phase of the signal $E_s$, and the output $E_o$ is restricted to the limiting value $E_e$, as shown in Figure 4, because of the voltage drop across resistor 33. Rectifiers 30, 31, in effect, short circuit the portion of the signal which exceeds the limiting value.

The device may be used as a modulator also by impressing the carrier voltage across terminals 27, 29 and by impressing the modulating voltage across primary winding 3 of transformer 1. The modulated voltage will appear across output terminals 26, 28.

The device provides a sinusoidal output of undistorted wave form and of limited amplitude corresponding to a sinusoidal signal of varying amplitude. The device is simple in construction, requires relatively few parts, and is compact in design.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the kind described, an input for receiving an A. C. signal, an output for producing a voltage corresponding to the signal but of limited amplitude, an impedance connected in series with said input and said output, a potentiometer having a tap connected to one side of said output, a full wave rectifier connected across said potentiometer and providing a pulsating voltage of the same frequency as the signal, a pair of oppositely disposed rectifiers connected across said potentiometer and connected to said impedance and to the other side of said output, said oppositely disposed rectifiers and said potentiometer being so arranged as to provide for current flow through said impedance when the amplitude of the signal exceeds the amplitude of the pulsating voltage, whereby a voltage drop occurs across said impedance to provide an output voltage corresponding to the signal but of limited amplitude.

2. A voltage limiting device for an alternating current circuit including two lines, said device comprising a pair of parallel circuits connected across the lines, a rectifier and an impedance in series in each circuit and the polarities of the rectifiers being opposite, an alternating current source of the same frequency as the voltage to be limited, and a full-wave rectifier connecting said source to points in the circuits between the rectifiers and impedances to oppose flow of current between the lines of the circuits.

3. A voltage limiting device having an input for receiving a signal of reversible phase and an output connected thereto for producing a voltage corresponding to the signal but of limited amplitude, a pair of parallel circuits connected across said output and each circuit including a rectifier and an impedance in series, the polarities of the rectifiers being opposite, an alternating current source of the same frequency as the signal to be limited, a full-wave rectifier connecting said source to points in the circuits between the rectifiers and impedances to oppose flow of current through said circuits when the signal amplitude is less than the limiting amplitude and to provide for current flow through said circuits when the signal amplitude exceeds the limiting amplitude.

4. A voltage limiting device having an input for receiving a signal of reversible phase and an output for producing a voltage corresponding to the signal but of limited amplitude, an impedance connected between said input and said output, a pair of parallel circuits connected across said output and each circuit including a rectifier and an impedance in series, the polarities of the rectifiers being opposite, an alternating current source of the same frequency as the signal, a full-wave rectifier connecting said source to points in the circuits between the rectifiers and impedances to oppose flow of current through said circuits when the signal amplitude is less than the limiting amplitude and to provide for current flow through said circuits when the signal amplitude exceeds the limiting amplitude, whereby a voltage drop equal to the excess of the signal amplitude over the limiting amplitude occurs across said first impedance and a voltage corresponding to the signal, but of limited amplitude, appears at said output.

References Cited in the file of this patent

UNITED STATES PATENTS

| Number | Name | Date |
|---|---|---|
| 2,144,995 | Pulvari-Pulvermacher | Jan. 24, 1939 |
| 2,438,518 | Piety | Mar. 30, 1948 |
| 2,453,958 | Anderson | Nov. 16, 1948 |
| 2,455,732 | Carter | Dec. 7, 1948 |
| 2,529,055 | Smoot | Nov. 7, 1950 |